(12) United States Patent
Ogura

(10) Patent No.: US 11,205,067 B2
(45) Date of Patent: Dec. 21, 2021

(54) RECOGNITION APPARATUS, RECOGNITION METHOD, AND NON-TRANSITORY COMPUTER READABLE MEDIUM

(71) Applicant: JVCKENWOOD CORPORATION, Yokohama (JP)

(72) Inventor: Takuya Ogura, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 98 days.

(21) Appl. No.: 16/860,285

(22) Filed: Apr. 28, 2020

(65) Prior Publication Data

US 2020/0257897 A1    Aug. 13, 2020

Related U.S. Application Data

(63) Continuation of application No. PCT/JP2018/040667, filed on Nov. 1, 2018.

(30) Foreign Application Priority Data

Mar. 20, 2018    (JP) .............................. JP2018-052836

(51) Int. Cl.
*G06K 9/00*    (2006.01)
*G06K 9/20*    (2006.01)
*G06K 9/68*    (2006.01)

(52) U.S. Cl.
CPC .......... *G06K 9/00362* (2013.01); *G06K 9/20* (2013.01); *G06K 9/6807* (2013.01)

(58) Field of Classification Search
None
See application file for complete search history.

(56) References Cited

U.S. PATENT DOCUMENTS

| | | | | |
|---|---|---|---|---|
| 7,949,151 | B2 * | 5/2011 | Taniguchi .......... | G06K 9/00369 382/104 |
| 7,982,748 | B2 * | 7/2011 | Taniguchi .......... | G06K 9/00805 345/619 |
| 10,134,140 | B2 * | 11/2018 | Akama ..................... | G06K 9/46 |
| 10,528,845 | B2 * | 1/2020 | Zheng .................. | G11B 27/031 |

(Continued)

FOREIGN PATENT DOCUMENTS

| | | |
|---|---|---|
| EP | 2312550 A1 | 4/2011 |
| JP | 2007-310705 A | 11/2007 |

*Primary Examiner* — Anand P Bhatnagar
(74) *Attorney, Agent, or Firm* — Procopio, Cory, Hargreaves & Savitch LLP

(57) ABSTRACT

A recognition apparatus includes an image acquisition unit configured to acquire an image obtained by photographing an object and a recognition processing unit configured to, when it is not clearly determined whether the object is a human being or an animal as a result of detecting the human being or the an animal in the acquired image using a full-body recognition dictionary of the human being and the animal, increase a certainty that the object is the animal to thereby detect the animal when the animal's head, face, or buttocks are detected in a range different from that of a human being within a detection range using a partial-body recognition dictionary, the partial-body recognition dictionary being for detecting the animal's head, face, or buttocks in the detection range in which the human being or the animal is detected.

6 Claims, 4 Drawing Sheets

(56) References Cited

U.S. PATENT DOCUMENTS

| | | | |
|---|---|---|---|
| 10,839,203 B1* | 11/2020 | Guigues | G06T 7/251 |
| 10,937,185 B2* | 3/2021 | Pescaru | G06K 9/00369 |
| 2007/0269079 A1* | 11/2007 | Taniguchi | G06K 9/00369 |
| | | | 382/104 |
| 2008/0130954 A1* | 6/2008 | Taniguchi | G06K 9/00369 |
| | | | 382/104 |
| 2013/0329964 A1* | 12/2013 | Nishi | G06K 9/00362 |
| | | | 382/110 |
| 2014/0003670 A1* | 1/2014 | Aimura | G06K 9/00791 |
| | | | 382/104 |
| 2014/0036104 A1* | 2/2014 | Nonaka | H04N 5/232 |
| | | | 348/222.1 |
| 2014/0198953 A1* | 7/2014 | Tanaka | G06K 9/6202 |
| | | | 382/103 |
| 2020/0175713 A1* | 6/2020 | Pescaru | G06K 9/00362 |

* cited by examiner

HUMAN FACING SIDEWAYS

HUMAN FACING BACK

HUMAN FACING FRONT

ANIMAL FACING SIDEWAYS (WITH FRONT AND REAR LEGS)

ANIMAL FACING BACK (WITH TAIL)

ANIMAL FACING FRONT (HEAD DOWN)

ANIMAL FACING FRONT (HEAD UP)

RECOGNITION APPARATUS, RECOGNITION METHOD, AND NON-TRANSITORY COMPUTER READABLE MEDIUM

CROSS REFERENCE TO RELATED APPLICATION

This application is a Bypass Continuation of PCT/JP2018/040667 filed on Nov. 1, 2018, which is based upon and claims the benefit of priority from Japanese patent application No. 2018-52836, filed on Mar. 20, 2018, the disclosure of which is incorporated herein in its entirety by reference.

BACKGROUND

The present disclosure relates to a recognition apparatus, a recognition method, and a recognition program.

A safety support apparatus which recognizes a situation in the vicinity of a vehicle using an image photographed by a camera mounted on the vehicle and warns a driver has become widespread. Such a safety support apparatus recognizes an object in the vicinity of the vehicle in the image photographed by the camera using a recognition dictionary and the like.

For example, Patent Literature 1 (Japanese Unexamined Patent Application Publication No. 2007-310705) describes a vehicle periphery monitoring apparatus which extracts an image region of an object from a photographed image, and when the region includes a first object region in which a ratio of widths in different directions falls within a predetermined range and a plurality of second object regions having an area smaller than that of the first object region below the first object region, determines that a type of the object is an animal other than a human being.

SUMMARY

The invention described in Patent Literature 1 uses, when an object is an animal other than a human being, characteristics (sizes of torso and front and rear legs, an aspect ratio thereof, and a positional relationship thereof, etc.) when the object is turned sideways in order to determine that the object is an animal. Commonly, when an animal appearing in an image is turned sideways, i.e., when the animal appearing in the image shows its side, the characteristics of human beings completely differ from those of animals. Thus, not many errors are made when determining whether an object is a human being or an animal.

However, when a human being or an animal appears in an image showing its front or back, there are in this case many similarities shown between the characteristics of human beings and those of animals, and thus an error may occur when determining whether an object is a human being or an animal.

To this end, this embodiment provides a recognition apparatus including: an image acquisition unit configured to acquire an image obtained by photographing an object; and a recognition processing unit configured to, when it is not clearly determined whether the object is a human being or an animal as a result of detecting the human being or the animal in the acquired image using a full-body recognition dictionary of the human being and the animal, increase a certainty that the object is the animal to thereby detect the animal when the animal's head, face, or buttocks are detected in a range different from that of a human being within a detection range using a partial-body recognition dictionary, the partial-body recognition dictionary being for detecting the animal's head, face, or buttocks in the detection range in which the human being or the animal is detected.

Further, this embodiment provides a recognition method including: a step of acquiring an image obtained by photographing an object; and a step of, when it is not clearly determined whether the object is a human being or an animal as a result of detecting the human being or the animal in the acquired image using a full-body recognition dictionary of the human being and an animal, increasing a certainty that the object is the animal to thereby detect the animal when the animal's head, face, or buttocks are detected in a range different from that of a human being within a detection range using a partial-body recognition dictionary, the partial-body recognition dictionary being for detecting the animal's head, face, or buttocks in the detection range in which the human being or the animal is detected.

DETAILED DESCRIPTION

Hereinafter, a recognition system and a recognition method according to this embodiment will be described with reference to the drawings.

The term "image" in the present specification includes still images and moving images.

Further, the term "animal" in the present specification refers to animals other than human beings.

The recognition system or the recognition method according to this embodiment detects a human being or an animal in an image obtained by photographing a traveling direction of a vehicle, and attempts to detect an animal again in a range where the human being or the animal is detected. The recognition system or the recognition method according to this embodiment can accurately detect a human being and an animal.

Firstly, a configuration of the recognition system according to this embodiment will be described.

Figure 1:
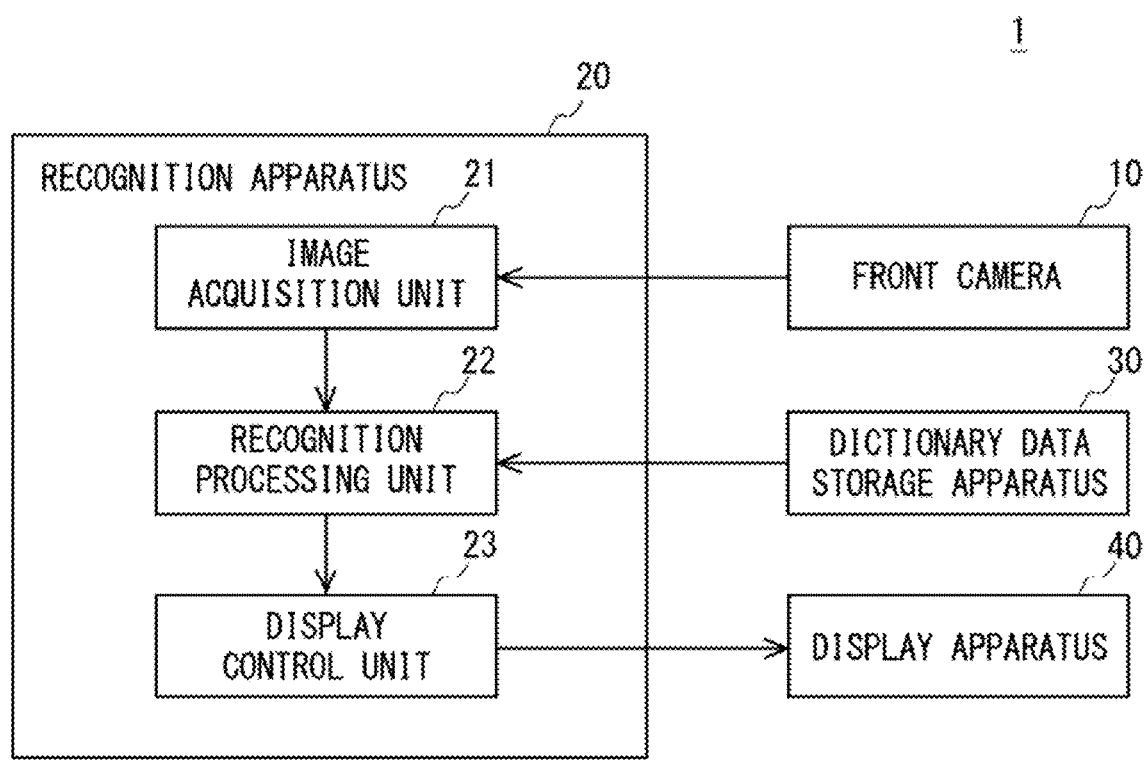
FIG. 1 is a block diagram showing a schematic configuration of a recognition system 1 according to an embodiment.

FIG. 1 is a block diagram showing a schematic configuration of a recognition system 1 according to this embodiment.

The recognition system 1 is, for example, a system mounted on the vehicle and used. The recognition system 1 includes a front camera 10, a recognition apparatus 20, a dictionary data storage apparatus 30, a display apparatus 40, and so on.

The front camera 10 photographs an image of the traveling direction of the vehicle, and inputs the image into the recognition apparatus 20. The front camera 10 is a far-infrared light camera, but instead it may be a camera using another wavelength region, for example, a combination of a visible light camera and a far-infrared light camera.

The recognition apparatus 20 detects a human being and an animal using the image photographed by the front camera 10, and outputs a warning signal to the display apparatus 40 or the like as necessary. The recognition apparatus 20 detects a human being and an animal, for example, for each frame or every few frames of the image photographed by the front camera 10. In order to do so, the recognition apparatus 20 includes an image acquisition unit 21, a recognition processing unit 22, a display control unit 23, and so on.

The image acquisition unit 21 inputs the image photographed by the front camera 10, performs various types of image processing on the image, and outputs the image to the recognition processing unit 22.

The recognition processing unit 22 detects a human being and an animal in the input image using a human recognition dictionary and an animal recognition dictionary stored in the dictionary data storage apparatus 30, and outputs a signal to the display control unit 23 so as to warn a driver as necessary.

The display control unit 23 performs control for displaying a warning image on the display apparatus 40 and outputting a warning sound.

The dictionary data storage apparatus 30 stores various recognition dictionaries such as the human recognition dictionary and the animal recognition dictionary.

The human recognition dictionary includes, for example, a human full-body recognition dictionary. The human full-body recognition dictionary is created by machine-learning a full-body image in which a pedestrian appears showing his/her front or back and a full-body image in which the pedestrian shows his/her side, i.e., a full-body image in which the pedestrian appears showing his/her side.

Figure 2:
FIG. 2 shows an example of pedestrian's full-body images according to the embodiment.
Figure 2:
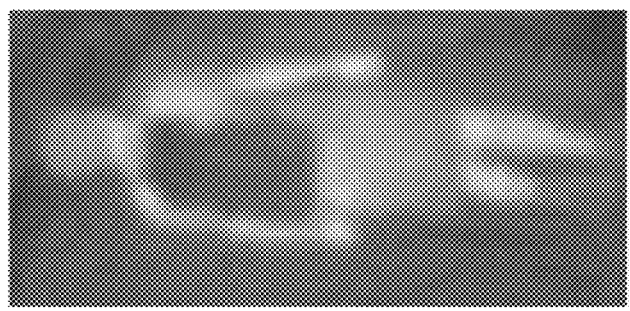
Figure 2:
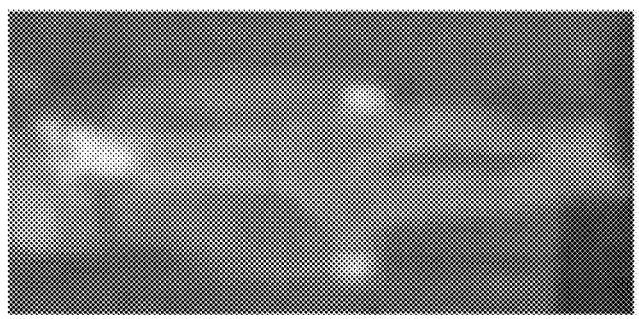

FIG. 2 is an example of the full-body images of a pedestrian according to this embodiment. These images are photographed at night using a far-infrared light camera, and are full-body images in which the pedestrian appears showing his/her front, back, and side in order from the left. In any of the images, parts where thermal radiation is large such as exposed regions of the skin are whiter than other parts.

When the image of a human being is used to perform the machine learning or detect a human being, a rectangular detection range that can accommodate a human full-body is used.

Further, the animal recognition dictionary includes, for example, an animal full-body recognition dictionary and an animal partial-body recognition dictionary.

The animal full-body recognition dictionary is also created by machine learning, for example, a full-body image in which an animal appears showing its front or back and a full-body image in which the animal appears showing its side.

Figure 3:
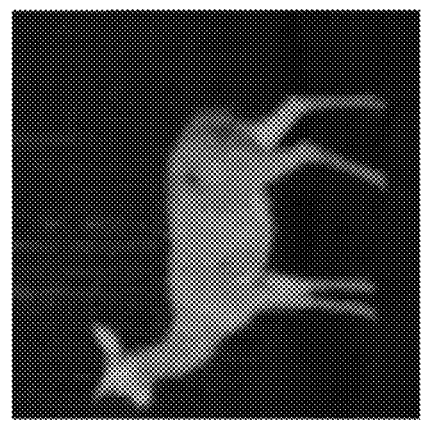
FIG. 3 shows an example of animal's full-body images according to the embodiment.
Figure 3:
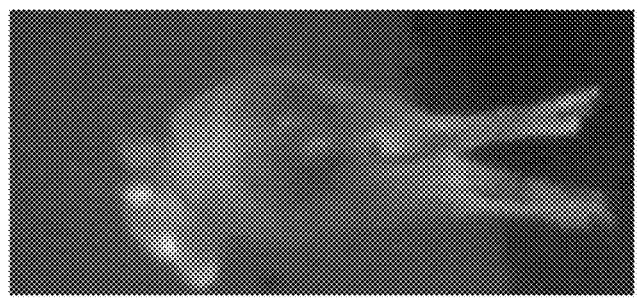
Figure 3:
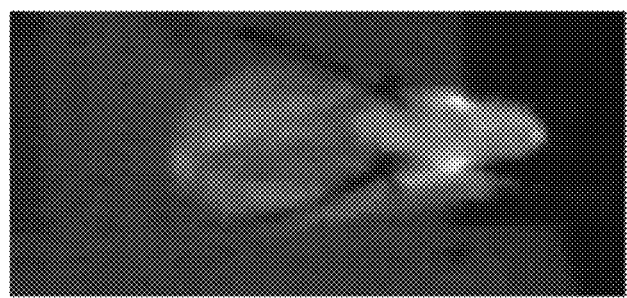
Figure 3:
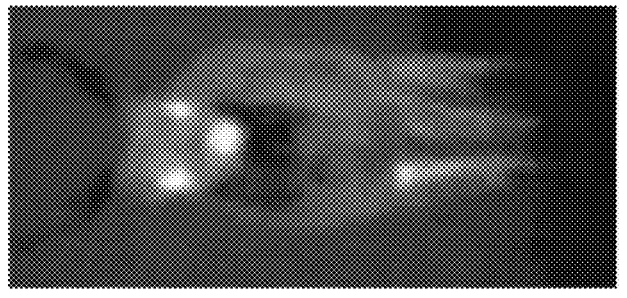

FIG. 3 is an example of the full-body images of an animal according to this embodiment. These images are also photographed at night using a far-infrared light camera, and are full-body images in which the four-legged animal appears showing its front (head up), front (head down), back, and side in order from the left. In any of the images, parts where thermal radiation is large such as the regions of eyes are whiter than other parts.

When the image of an animal is used to perform the machine learning or detect an animal, a rectangular detection range that can accommodate an animal full-body is used. For this reason, for example, when the animal appears in the image showing its front or back, a vertically long detection range is used, whereas when the animal appears in the image showing its side, a square or horizontally long detection range is used.

The animal partial-body recognition dictionary is created by machine learning an image in which a part of the animal's body appears or an image obtained by cutting out a part of the full-body image of the animal. The animal partial-body recognition dictionary includes an animal head recognition dictionary, an animal face recognition dictionary, and an animal buttock recognition dictionary, etc.

In particular, animals have pointed horns and erect ears on their head, and a drooping tail on their buttocks, both of which are not found in human beings and can be important characteristics for detecting animals.

The display apparatus 40 warns the driver that the human being, the animal, or the like is present in the traveling direction of the vehicle by an image, a sound, or the like.

Note that a part of the configuration of the recognition apparatus 20 may be replaced by another apparatus connected via communication means (not shown). For example, the recognition processing unit 22 may be replaced by a recognition server connected via the communication means.

Further, the dictionary data storage apparatus 30 may be replaced by a server connected via the communication means.

Each component implemented by the recognition apparatus 20 can be implemented, for example, by executing a program under control of an arithmetic apparatus (not shown), which is a computer, included in the recognition apparatus 20. To be more specific, the recognition apparatus 20 loads a program stored in a storage unit (not shown) into a main storage apparatus (not shown), and executes the program under the control of the arithmetic apparatus.

Further, each component is not limited to being implemented by software executed by a program, and may instead be implemented by any combination of hardware, firmware, and software.

The above-mentioned program can be stored and provided to the recognition apparatus 20 using any type of non-transitory computer readable media. Non-transitory computer readable media include any type of tangible storage media.

Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.).

The program may be provided to the recognition apparatus 20 using any type of transitory computer readable media. Examples of transitory computer readable media include electric signals, optical signals, and electromagnetic waves. Transitory computer readable media can provide the program to the recognition apparatus 20 via a wired communication line (e.g. electric wires, and optical fibers) or a wireless communication line.

Next, an operation of the recognition system 1 according to this embodiment, i.e., a recognition method, will be described.

Figure 4:
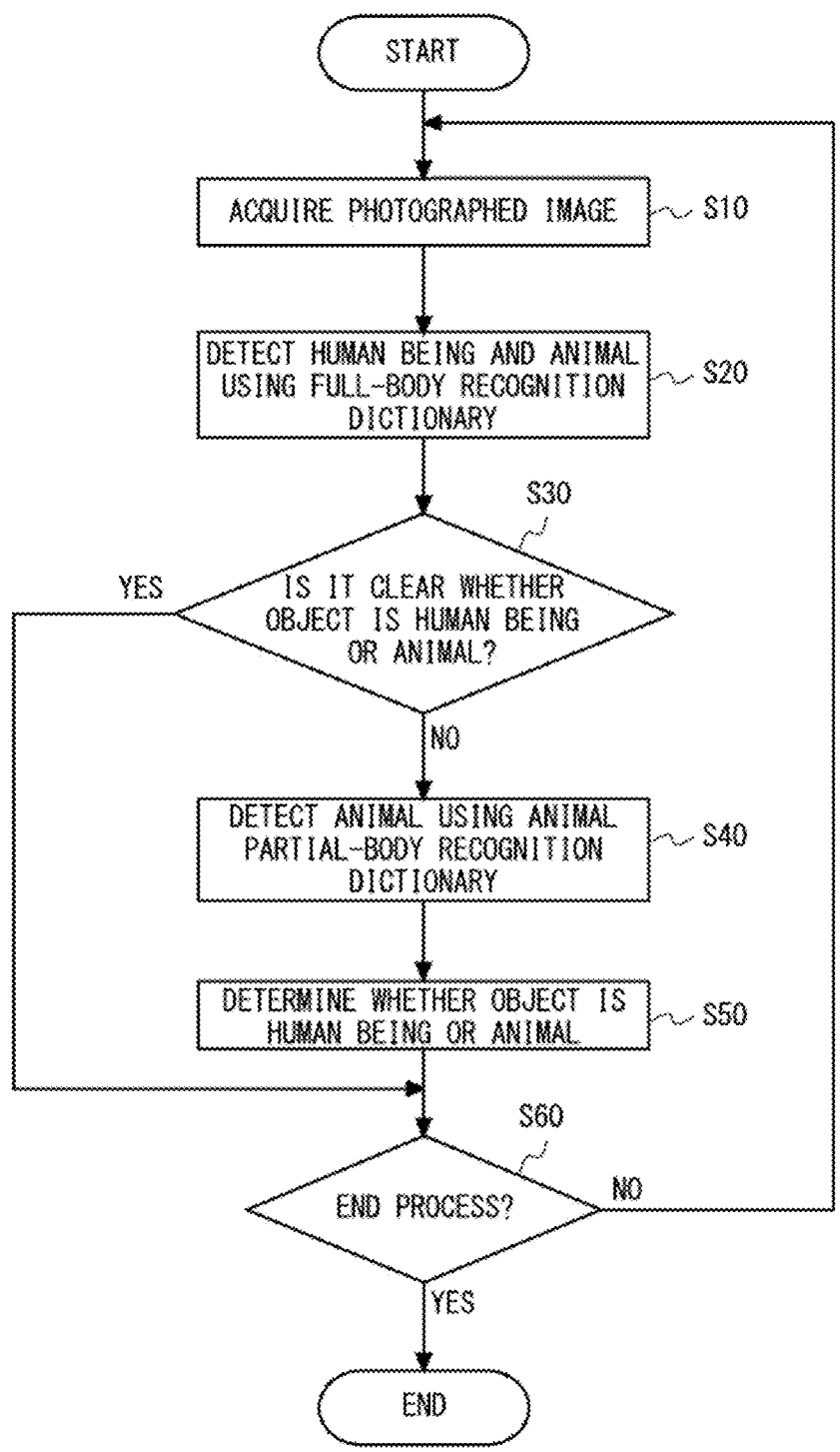
FIG. 4 is a flowchart showing a processing procedure of a recognition method according to the embodiment.

FIG. 4 is a flowchart showing a processing procedure of the recognition method according to this embodiment.

When the recognition system 1 starts an operation, the front camera 10 photographs an image of the traveling direction of the vehicle, and the image acquisition unit 21 acquires the image as a recognition target image (Step S10). The image acquisition unit 21 acquires a photographed image including an image region in which a human being or an animal appears, for example, like the ones shown in FIGS. 2 and 3.

Next, the recognition processing unit 22 defines the entire photographed image or a part of the photographed image as the recognition target region and detects a human being and an animal using the human full-body recognition dictionary and the animal full-body recognition dictionary stored in the dictionary data storage apparatus 30 (Step S20).

Next, the recognition processing unit 22 determines whether a detection result in Step S20 clearly indicates that the object is a human being or an animal (Step S30).

In the processing of Step S30, a determination is made on the detection result of Step S20 indicating that it is not clear as to whether the object is a human being or an animal, for example, when the probability that the object is a human being based on the human full-body recognition dictionary is 40%, and the probability that the object is an animal based on the animal full-body recognition dictionary is 60%.

A specific probability to be used as a reference to determine whether it is clear that the object is a human being or an animal may be any probability. However, for example, when the probability that the object is one of a human being and an animal is 80% or higher, and a difference between this probability and the probability that the object is the other one of a human being or an animal is 50% or higher, it may be determined that it is clear that the object is one of a human being or an animal, whichever with a higher probability.

When the recognition processing unit 22 clearly detects a human being or an animal (Yes in Step S30), the process proceeds to Step S60. Then, the display control unit 23 warns the driver of the human or the animal clearly detected in the detection processing of Step S20.

Moreover, when it is not clear as to whether the detection result indicates that the object is a human being or an animal (No in Step S30), the recognition processing unit 22 defines an entire detection frame (detection rectangle) at the time of the detection as the recognition target region, and detects an animal's head, face, or buttocks using the animal partial-body recognition dictionary stored in the dictionary data storage apparatus 30 (Step S40).

When it is not clear as to whether the detection result indicates that the object is a human being or an animal (No in Step S30), if the detection frame at the time of the detection has a vertically long shape, the recognition processing unit 22 may define the entire detection frame as the recognition target region and detect ab animal's head, face, or buttocks using the animal partial-body recognition dictionary stored in the dictionary data storage apparatus 30.

This is to take into consideration the fact that when a human being or an animal is detected in the processing of Step S20, if the detection frame at the time of the detection is a square or a horizontally long shape, the object is often an animal viewed from its side, and the fact that when an animal is viewed from its side, the detection result indicating a high probability that the object is an animal based on the animal full-body recognition dictionary can be achieved.

At this time, when the recognition processing unit 22 detects an animal's head or face in a predetermined range at a lower side of the recognition target region, for example, in a lower half of the recognition target region or a lower third of the recognition target region, it increases a certainty that an animal is detected. When an animal eats grass, the animal's head or face is often located near the animal's feet at the lower side of the recognition target region or near the ground, which is a characteristic not found in human beings.

Further, when the recognition processing unit 22 detects the animal's head or face in a predetermined range at an upper part of the recognition target region, for example, in an upper half of the recognition target region or an upper third of the recognition target region, it increases a certainty that the animal is detected. When an animal is standing with its four legs and showing its back, i.e., showing its rear part, the animal's buttocks are often located near the upper side of the recognition target region, which is also a characteristic not found in human beings.

Then, the recognition processing unit 22 determines whether the object detected in Step S20 is a human being or an animal based on the detection result of a human being or an animal in Step S20 and the detection result of an animal in Step S40 (Step S50).

For example, in Step S20, when the probability that the object is a human being is higher than the probability that the object is an animal but the recognition processing unit 22 cannot clearly determine that the object is a human being, if an animal's head, face, or buttocks are detected in a range different from that of a human being in the detection of Step S40, the recognition processing unit 22 determines that the object detected in Step S20 is an animal.

Moreover, in Step S20, when the probability that the object is a human being is higher than the probability that the object is an animal in Step S20 but the recognition processing unit 22 cannot clearly determine that the object is a human being, if an animal's head, face, or buttocks are not detected in a range different from that of a human being in the detection of Step S40, the recognition processing unit 22 may determine that the object detected in Step S20 is a human being.

Further, in Step S20, when the probability that the object is an animal is higher than the probability that the object is a human being but the recognition processing unit 22 cannot clearly determine that the object is an animal, if the animal's head, face, or buttocks are detected in a range different from that of a human being in the detection of Step S40, the recognition processing unit 22 determines that the object detected in Step S20 is an animal.

Furthermore, in Step S20, when the probability that the object is the animal is higher than the probability that the object is the human being but the recognition processing unit 22 cannot clearly determine that the object is the animal, if the animal's head, face, or buttocks are not detected in a range different from that of a human being in the detection of Step S40, the recognition processing unit 22 may determine that the object detected in Step S20 is a human being.

Then, when the recognition processing unit 22 detects a human being or an animal, the display control unit 23 notifies the driver that a pedestrian or an animal has been detected through the display apparatus 40.

Next, the recognition apparatus 20 determines whether to end the recognition method (Step S60), and when it determines to end it (Yes in Step S60), it ends the process.

As described above, the recognition system 1 or the recognition method according to this embodiment detects a human being or an animal in the photographed image and attempts to detect an animal again in a range in which the human being or the animal is detected. The recognition system 1 or the recognition method according to this embodiment can accurately detect human beings and animals and distinguish between human beings and animals.

Note that in the recognition system 1 or the recognition method according to this embodiment, various additions, modifications or changes can be made.

For example, when the recognition processing unit 22 detects a human being or an animal, it may calculate a distance from the vehicle to the human being or the animal and a size of the human being or the animal based on a position and a size of the detection frame on the image in which the human being or the animal appearing in the image is detected, and then notify the driver of them.

When the distance to the human being and the animal is detected based on the size of the detection frame, for example, the calculation is performed assuming that the human's height is 1.7 m and a length of the animal is 1.0 m. Thus, the distance to be calculated when the object detected in a certain detection frame is an animal differs from the distance to be calculated when the object detected in the same certain detection frame is a human being by 1.7 times. For this reason, by accurately distinguishing between human beings and animals by means of the recognition system 1 according to this embodiment, it is possible to more accurately calculate the distance to the detected human being, animal, or the like.

Moreover, the display control unit 23 may change the method of notifying the driver between when a human being such as a pedestrian is detected and when an animal is detected. For example, animals sometimes travel in a group or perform unpredictable actions such as running out into a road, and thus when an animal is detected, the driver may be notified early.

In addition, in the recognition method, an attempt may be made to detect an animal from Step S40 onward only when a human being or an animal is detected within one region or proximate regions in Step S20.

Further, in Step S40, an attempt may be made to detect a human being using a human partial-body recognition dictionary in addition to the animal partial-body recognition dictionary.

Furthermore, the configuration of the recognition system is not limited to the above, and instead, a plurality of apparatuses such as the recognition apparatus 20 and the dictionary data storage apparatus 30 may be integrated into a recognition apparatus including a dictionary data storage unit. Alternatively, the entire configuration of the recognition system may be integrated into a recognition apparatus including a front camera, a dictionary data storage unit, and a display unit. Systems may be in forms of, for example, a human recognition system, an animal recognition system, and a human-animal distinguish system as a matter of course.

As for the use of the recognition system in a vehicle, in addition to the form in which a part or all of the configuration of the recognition system is mounted on the vehicle, a part or all of the configuration of the recognition system may be mounted on the vehicle in such a way that it becomes portable or retrofitable.

In addition to the use of the recognition system in a vehicle, for example, the recognition system may be installed in a building, and a camera may be provided in front of an automatic door or the like to be used to determine whether to open or close the automatic door. In this case, a determination may be made such that the automatic door is opened only when an object is determined to be a human being or the automatic door is closed when the object is determined to be an animal.

Further, instead of image recognition using the dictionary created by machine-learning images of human beings and animals or in addition to the dictionary created by machine-learning images of human beings and animals, the recognition processing unit 22 may perform different image recognition such as pattern matching using, for example, templates of human beings and animals.

As described above, the recognition apparatus 20 according to this embodiment includes the image acquisition unit 21 configured to acquire an image obtained by photographing an object and the recognition processing unit 22 configured to detect a human being or an animal in the acquired image using a full-body recognition dictionary of a human being and an animal and increase a certainty that the object is the animal to thereby detect the animal when the animal's head, face, or buttocks are detected in a range different from that of the human being within a detection range using a partial-body recognition dictionary which is for detecting the animal's head, face, or buttocks in the detection range in which the human being or the animal is detected.

Such a configuration makes it possible to correctly detect a human being or an animal in the image.

Further, the recognition method according to this embodiment includes Step S10 of acquiring an image obtained by photographing an object and Steps S20 to S50 of detecting a human being or an animal in the acquired image using a full-body recognition dictionary of a human being and an animal, and increasing a certainty that the object is the animal to thereby detect the animal when the animal's head, face, or buttocks are detected in a range different from that of a human being within a detection range using a partial-body recognition dictionary which is for detecting the animal's head, face, or buttocks in the detection range in which the human being or the animal is detected.

Such a configuration makes it possible to correctly detect a human being or an animal in the image.

The recognition apparatus, the recognition method, or the recognition program according to the embodiment can be used, for example, in a vehicle or the like and can correctly detect a human being or an animal from an image, and has industrial applicability.

What is claimed is:

1. A recognition apparatus comprising:
an image acquisition unit configured to acquire an image obtained by photographing an object; and
a recognition processing unit configured to, when it is not clearly determined whether the object is a human being or an animal as a result of detecting the human being or the animal in the acquired image using a full-body recognition dictionary of the human being and the animal, increase a certainty that the object is the animal to thereby detect the animal when the animal's head, face, or buttocks are detected in a range different from that of the human being within a detection range using a partial-body recognition dictionary, the partial-body recognition dictionary being for detecting the animal's head, face, or buttocks in the detection range in which the human being or the animal is detected.

2. The recognition apparatus according to claim 1, wherein the recognition processing unit detects an animal by increasing the certainty that the object is the animal when the animal's head or face is detected at a lower side of the detection range.

3. The recognition apparatus according to claim 1, wherein the recognition processing unit increases the certainty that the object is the animal when it detects the animal's buttocks at an upper side of the detection range.

4. The recognition apparatus according to claim 1, wherein the recognition processing unit performs the detection for detecting the animal's head, face, or buttocks when the detection range of the object detected using the full-body recognition dictionary of the human being and the animal is a vertically long shape.

5. A recognition method comprising:
a step of acquiring an image obtained by photographing an object; and
a step of, when it is not clearly determined whether the object is a human being or an animal as a result of detecting the human being or the animal in the acquired image using a full-body recognition dictionary of the human being and the animal, increasing a certainty that the object is the animal to thereby detect the animal when the animal's head, face, or buttocks are detected in a range different from that of the human being within a detection range using a partial-body recognition dictionary, the partial-body recognition dictionary being for detecting the animal's head, face, or buttocks in the detection range in which the human being or the animal is detected.

6. A non-transitory computer readable medium storing a recognition program for causing a computer to execute:
   a procedure of acquiring an image obtained by photographing an object; and
   a procedure of, when it is not clearly determined whether the object is a human being or an animal as a result of detecting the human being or the animal in the acquired image using a full-body recognition dictionary of the human being and the animal, increasing a certainty that the object is the animal to thereby detect the animal when the animal's head, face, or buttocks are detected in a range different from that of a human being within a detection range using a partial-body recognition dictionary, the partial-body recognition dictionary being for detecting the animal's head, face, or buttocks in the detection range in which the human being or the animal is detected.

* * * * *